United States Patent Office 3,109,693
Patented Nov. 5, 1963

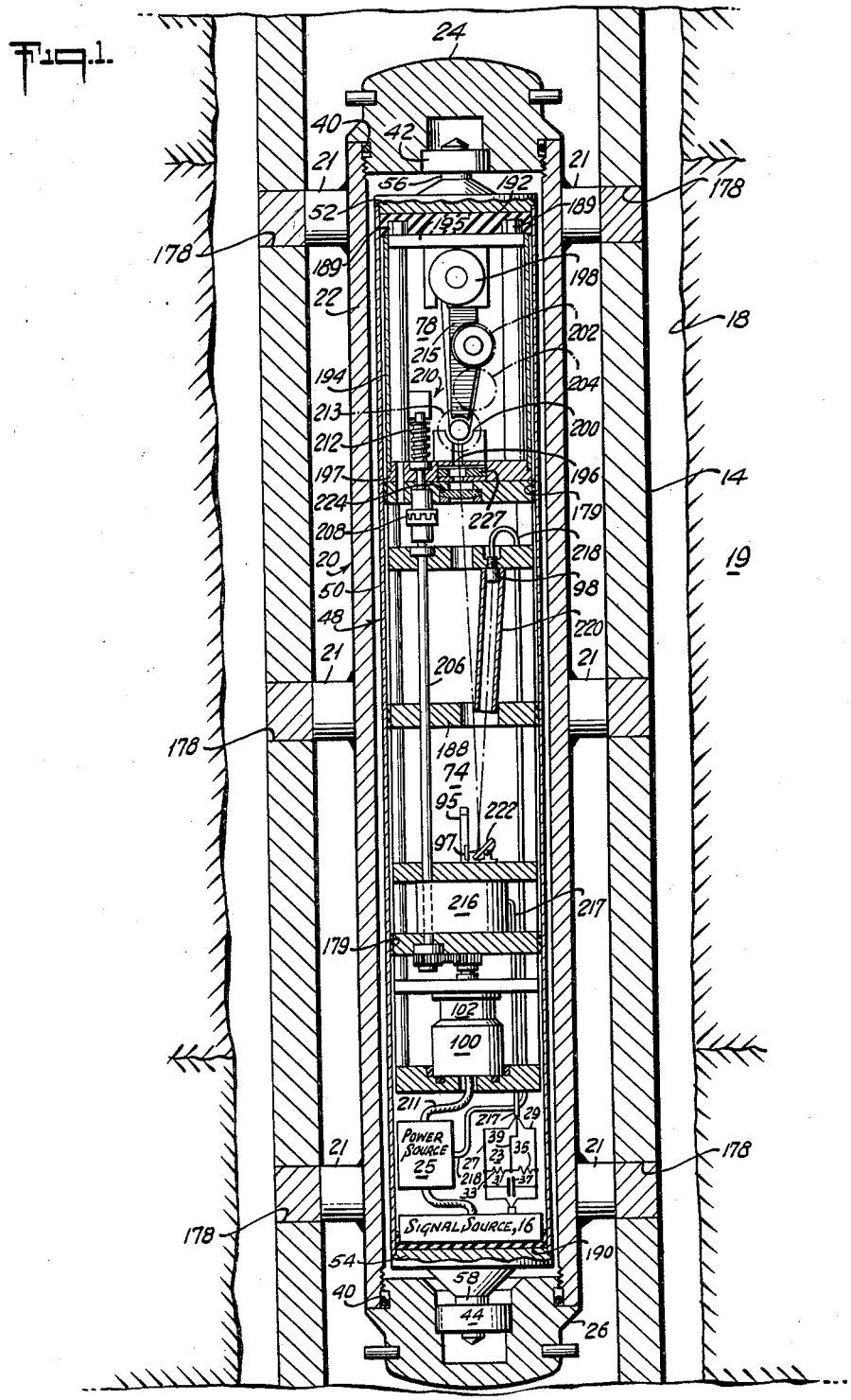

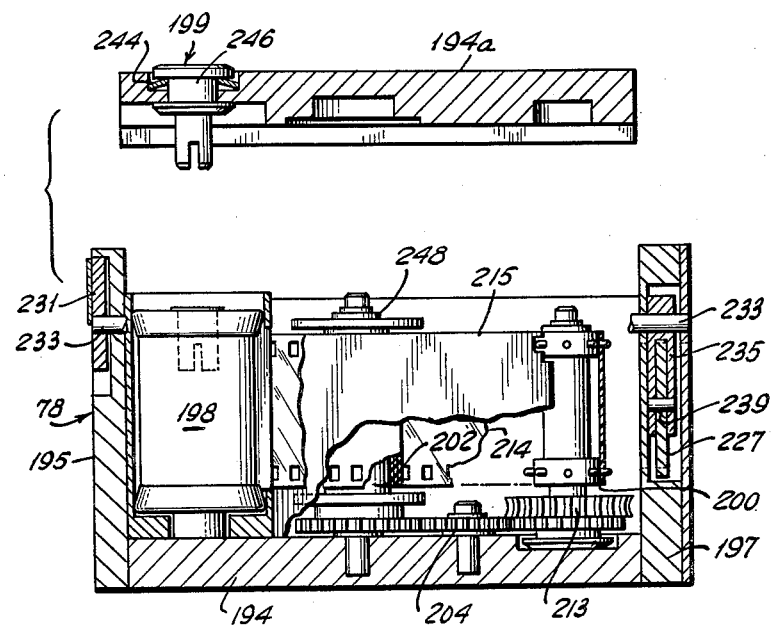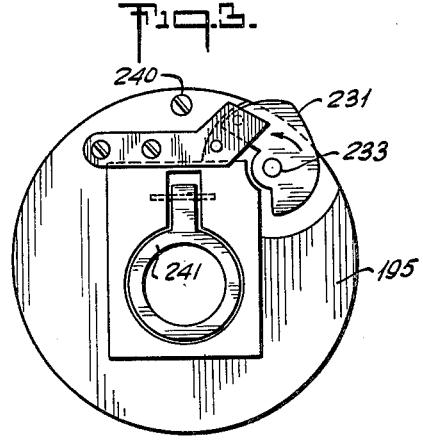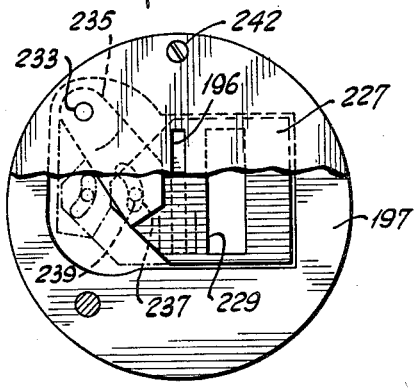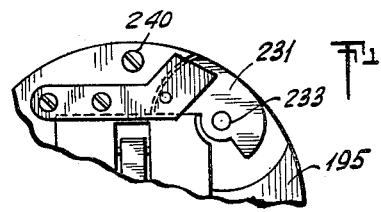

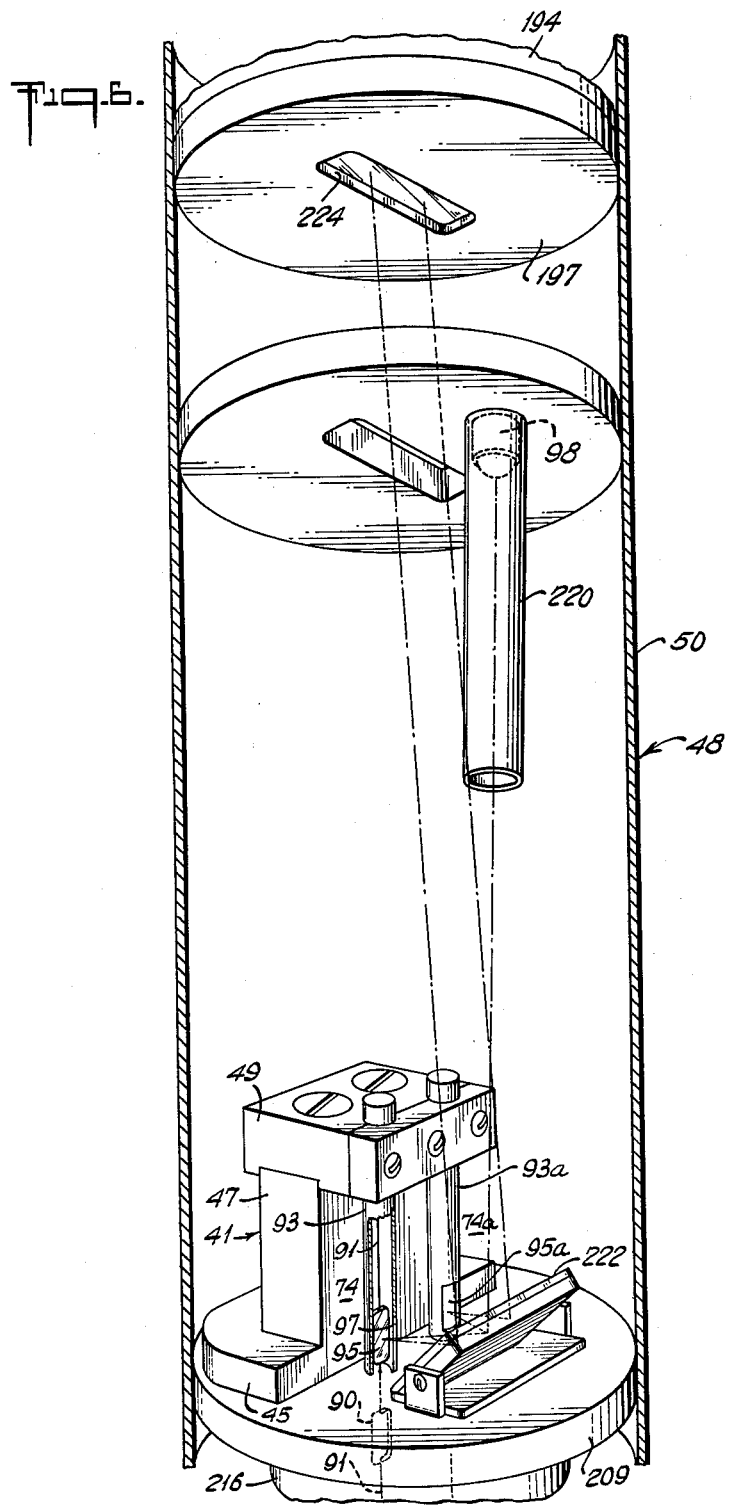

3,109,693
RECORDING DEVICE
Roy J. Clements and Burton D. Lee, Houston, Billy H. Towell and William R. McEvers, Jr., Bellaire, Tex., and John J. Havlik, Houston, Tex., assignors to Texaco Inc., a corporation of Delaware
Filed Dec. 26, 1958, Ser. No. 783,057
7 Claims. (Cl. 346—109)

This invention relates to a recording device and more particularly to an oscillograph which may be used in apparatus for simultaneously drilling and logging a borehole.

In the conventional method of logging a borehole the log is obtained during a time interval after the drilling operation is suspended and the drill pipe is removed from the borehole. The logging instrument is then lowered into the borehole on a steel shrouded multi-conductor cable and, as the instrument passes different geological strata, information in the form of electrical signals is transmitted from the bottom of the borehole through the conductor cable to the surface of the earth where it is recorded on a chart.

In order to overcome disadvantages encountered during the interruption in the drilling process of a borehole, a method of geological prospecting has been developed which comprises drilling a borehole, simultaneously and continuously detecting a physical variable in the borehole, simultaneously and continuously recording in the hole the physical variable, and simultaneously and continuously recording the depth in the hole at which the physical variable is being detected.

In accordance with the present invention, a recording device is provided which is particularly suitable for recording a physical variable in the borehole simultaneously and continuously with the drilling process. The apparatus of this invention is more specifically an oscillograph adapted to be inserted into a pressure-tight capsule mounted at the lower end of a drill stem or string which comprises a sensitive galvanometer and a camera for recording a light signal therefrom.

In order that the invention may be more clearly understood and readily carried into effect, it will now be described more fully with reference to the accompanying drawing in which:

FIG. 1 is an elevational view, partly in section, of the oscillograph in accordance with the present invention.

FIG. 2 is a more detailed view of the camera shown in FIG. 1.

FIG. 3 is a view of the rear end of the camera shown in FIG. 2.

FIG. 4 is a view of the front end of the camera shown in FIG. 2.

FIG. 5 is another view of a portion of the rear end of the camera shown in FIG. 2, and FIG. 6 is a more detailed view of the galvanometer and its relation to the camera shown in FIG. 1.

Referring to the drawing wherein like elements in the various figures have the same reference numerals, there is shown in FIG. 1 a tubular housing or pipe 14 which is preferably disposed in the lower portion of a drill stem or string, for example, between the bit and drill collar thereof which is used to drill a borehole 18 traversing one or more formations of the earth, for example, 19. A sealed container or capsule 20 adapted to withstand pressures of at least 16,000 to 20,000 pounds per sq. inch is disposed axially within the housing 14 and is rigidly secured thereto by bosses or studs 21. The capsule 20 includes a hollow cylinder 22 and top and bottom caps 24 and 26, respectively. The top and bottom caps 24 and 26 of the capsule 20 threadedly engage the cylinder 22. O-rings 40 are located between the caps 24, 26 and the cylinder 22 to provide effective pressure seals for the capsule 20. Disposed in the top and bottom caps 24 and 26 along the axis of the cylinder 22 are thrust bearings 42 and 44 respectively, which may be essentially ball bearings. Disposed within the pressure-tight capsule 20 is an inner case 48 which comprises a hollow cylinder 50 and upper and lower plates 52 and 54 having support shafts 56 and 58, respectively. The shafts 56 and 58 are disposed along the axis of the inner case 48 and are adapted to engage the thrust bearings 42 and 44, respectively, in the caps 24 and 26 to substantially isolate the inner case 48 from torsional forces, which are applied at the earth's surface in rotary drilling and in the borehole in turbo drilling to the drill stem, due to the rotatability of the inner case 48 within the capsule 20.

The inner case 48 is adapted to be easily inserted into and removed from the pressure tight capsule 20. When the inner case 48 is inserted into the capsule 20 the lower shaft 58 slides into and is held in position by the bearing 44. The top cap 24 with the upper thrust bearing 42 is placed over the upper shaft 56 so that the bearing 42 slides over the shaft 56. The top cap 24 is then secured to the cylinder 22 of the capsule 20 preferably by threadedly engaging same.

In order to rigidly connect the capsule 20 to the housing 14, the studs or bosses 21 are welded to the outside surface of the capsule 20 and a like number of holes or openings 178 are drilled through the housing 14 at points which are spaced so as to be aligned with the welded studs 21 when the capsule 20 with the welded studs 21 is inserted into the housing 14. After the studs are aligned with the openings 178 they are welded to the housing 14 and each of the openings 178 is filled with the weld so as to provide a smooth surface.

The inner case 48 contains the oscillograph of the present invention which includes a galvanometer 74 and a camera 78. Also included within the inner case 48 is a signal source 16, circuit means 23 for applying the signals from the signal source 16 to the galvanometer 74 and an electrical power source 25. The signal source 16 may be any suitable circuit from which may be derived a signal indicative of a desired physical characteristic within or without the inner case 48, for example, temperature, radioactivity or resistivity. The power source 25 may include a battery preferably composed of mercury cells and a suitable commutator for converting direct current from the batteries into alternating current.

The galvanometer 78 which is of the D'Arsonval type and which is shown in more detail in FIG. 6, of the oscillograph comprises a permanent magnet 216 for producing a magnetic field in which a galvanometer coil 90 is suspended for rotation about the axis of the inner case 48. The coil 90 is held in position by strings 91 extending from a point within the magnet 216 to the remote end of a coil housing 93 secured at the upper end by a pedestal mount 41, described hereinafter more fully, which is supported on a top galvanometer pole piece 209 attached to the magnet 216. The strings 91 are preferably electrically conductive wires which in addition to supporting the coil 90 carry electrical signals from the signal source 16 and the circuit means 23 to the galvanometer coil 90. The circuit means 23 may include a pair of conductors 27 and 29 between which is connected the galvanometer coil 90 and a resistance-capacitance circuit 31 for providing a suitable time constant. A galvanometer mirror 95 is secured to the string 91 and a window 97 is located in the coil housing 93 to permit a light beam from without the housing 93 to be reflected by the galvanometer mirror 95. The light beam is produced by an electrical light bulb 98, which may be a conventional surgical lamp, and a light shield or guard 220. The light bulb 98 is energized by the power source 25 to which it is connected by cable 218. The light shield 220 directs the beam to a front or first surface mirror 222 where it is deflected to the galvanometer mirror 95 through the housing window 97. The galvanometer mirror 95 then reflects the light back to the front surface mirror 222 which is positioned with respect to the galvanometer mirror 95 so that it deflects the light toward the camera 78 through a plano-convex lens 224 which converges the light rays in the beam to form a clear, sharp trace on the film 214.

The camera 78 illustrated in more detail in FIGS. 2–5, comprises a cylindrical housing 194 having a rear plate 195 and front plate 197 in which there is a slit or opening 196, a film supply spool 198, for example, a conventional 35 mm. cassette, a film sprocket 200, a take-up spool 202, and an idler gear 204 interposed between the film sprocket 200 and the take-up spool 202. The film sprocket 200 is driven by a motor 100 through suitable reduction gears 202, a shaft 206, a clutch 208 and a worm gear 210 comprising a worm 212 and a worm wheel 213 attached to sprocket 200. The motor 100 may be a D.C. motor energized by the power source 25 through cable 211 and having suitable speed control means, for example, of the conventional centrifugal type wherein the speed is controlled by make and break contacts. The clutch 208 is preferably a disengageable multi-jaw coupling having one half thereof rigidly connected to shaft 206 and the other half thereof rigidly connected to the worm 212 of the worm gear 210 disposed in the camera 78. In order to prevent film 214 from the supply spool 198 to be unwound at a faster rate than called for by the film sprocket 200 a spring loaded drag 199 is attached to the supply spool 198, as shown in FIG. 2. The spring loaded drag 199 includes a Belleville spring 244 engaging the housing portion 194a and the axle 246 of the supply spool 198 so as to set up frictional forces which tend to prevent rotation of axle 246. In order to provide a tightly wound film on the take-up spool 202, the spool 202 is driven at a speed which tends to take up the film 214 at a rate faster than it is given up by the film sprocket 200, frictional slippage means being provided in the take-up spool 202 to prevent the film 214 from tearing. The frictional slippage means may, for example, include a spring or wire disposed longitudinally between a take-up spool shaft 248 and the take-up spool 202 and mounted on the shaft 248.

The force exerted on the supply spool 198 by the spring loaded drag 199 must be limited in value depending upon the strength of the film 214 and upon the force exerted by the sprocket 200. Since, due to vibrational forces in the camera 78 during the drilling operation, the film 214 from the supply spool 198 may be at times payed out at a faster rate than the rate at which it is taken up by the sprocket 200, the loose film may cause the camera 78 to become inoperative. In order to minimize inoperativeness caused by the loose film an anti-jamming film fence 215 is disposed in the camera 78 to prevent the film 214 from being prematurely wound on the take-up spool 202 or on the sprocket 200. The size and shape of the fence is determined in general by the predetermined path traversed by the film 214 so as to maintain the film 214 in that path.

The fence, therefore, is made to act as a restraining member or elongated guide which not only prevents the film from being prematurely wound on the take-up spool 202 or sprocket 200 but also holds the unwound film in a position in which the rigidity of the film in the direction of its longitudinal axis opposes substantially the forces tending to unwind the film at a faster rate than that desired. The fence 215 may be made of any suitable rigid material which may be secured to the inside wall of the camera 78 opposite the cover or detachable portion 194a of the camera housing 194 so as to project therefrom into the area within the housing 194 defined substantially by the film 214. The cover 194a is secured to the rear and front plates 195 and 197 of the camera 78 by screws which pass through the opening 240 in front plate 195 and the opening 242 in rear plate 197.

During the recording process the camera 78 operates as a shutterless camera, that is, the film 214 moves at a constant speed past the opening 196 in the front end plate 197 of the camera housing 194 through which the light signal is continuously passing. However, in order to protect the film from exposure before the camera 78 is placed in its operative position in the inner case 48 and after it is removed therefrom, a shutter 227 has been provided to prevent light from passing through the opening 196 into the camera 78. The shutter 227 is in its open position when an aperture 229 therein is aligned with the opening 196 in the camera housing 194 as shown in FIG. 1 and in its close position when an opaque portion of the shutter 227 covers the opening 196 in the camera housing 194 as shown in FIG. 4. The means for operating the shutter include a rear end lever 231 attached to a shaft 233 passing through the camera 78 from the front to the rear end thereof, as shown in FIGS. 2, 3, and 5 and a front end lever 235 attached to the shaft 233 and having a curved slot 237 therein adapted to receive a pin 239 attached to the shutter 227, as shown in FIGS. 2 and 4. The rear end lever 231 is designed so as to have at least a portion thereof extend outside the periphery of the camera housing 194 when the shuter 227 is in the closed position, thus to prevent the camera 78 from being fully inserted into the inner case 48. Before the camera 78 can be fully installed in its operative position in the inner case 48, the shutter 227 must be placed in its open position by operating the lever 231 until it is wholly within the periphery of the camera housing 194, as shown in FIG. 5. When the camera 78 is to be taken out of the inner case 48, the film 214 in the camera 78 may be protected from exposure to light by merely operating the rear end lever 231 to slide the shutter 227 into the closed position before fully withdrawing the camera 78 from the inner case 48. If desired a force may be continuously applied to the shutter 227 or to the operating means to urge the shutter 227 into the closed position, for example, by utilizing spring biasing means, thus to close the shutter 227 automatically when the camera is withdrawn from the inner case 48. In order to facilitate the withdrawal of the camera 78 from the inner case 48, a retracting ring 241 is pivotally attached to the rear end of the camera housing 194.

FIG. 6, in addition to showing a more detailed view of the oscillograph of the present invention, also shows an embodiment of an oscillograph which is provided with a second galvanometer 74a including a coil housing 93a having a window 95a therein. The two galvanometers 74 and 74a are disposed as close as possible to the axis of rotation of the inner case 48 in order to minimize the effect of the centrifugal force which may be produced in the inner case 48 during the drilling operation. In the two galvanometer embodiment of this invention the front surface mirror 222 and the cross-section of a light beam formed by the shield 220 must have sufficient area to pass a portion of the light beam through the window of each of the coil housings 93 and 93a to the galvanometer mirrors contained therein. The two galvanometers 74 and 74a may have different sensitivities and may be used in recording signals representative of the same physical characteristic to provide an accurate and clear record of a wide range of values of the desired characteristic. More specifically, the wide range of values may be accurately recorded by coupling the coil of each of the galvanometers 74 and 74a to unequal amounts of an impedance connected across the signal source of the desired physical characteristic. The coil of galvanometer 74 may be connected through conductors 27 and 39 of cable 217 to a first resistor 33 of the circuit means 23 illustrated in FIG. 1 of the drawing and the coil of galvanometer 74 may be connected through conductors 29 and 39 to a second resistor 35 having a resistance value different from that of the first resistor 33. A capacitor 37 having a value dependent upon the desired time constant may be connected across the signal source 16. In practice a capacitor of 500 microfarads has been found to produce a clear smooth trace but, of course, other values may be used depending upon the desired amount of filtering and upon the values of other elements used in the circuit. Alternatively, the two galvanometers 74 and 74a may be used in the recording of two different physical characteristics, for example, formation resistivity and natural potential. It should be understood that, if desired, more than two galvanometers may be used in the oscillograph of the present invention, the number of galvanometers being dependent upon such factors as the number of logs desired, the width of the film and the size of the inner case 48.

Also shown in FIG. 6 is a pedestal mount 41 comprising a support base 45 attached to the top galvanometer pole piece 209 and an upright member 47 with an arm 49 extending therefrom, the arm 49 having fastening means for retaining the upper portion of each of the galvanometer housings 93 and 93a. As illustrated in the drawing, the pedestal mount is made up of separate elements but it may be an integral member. The pedestal mounting 41 is used as a damping block to (1) provide support for the upper portion or section of the galvanometers housings 93 and 93a which minimizes vibration of the inner suspension or strings 91, i.e., of the galvanometer coil, (2) serve as an additional means of holding galvanometer alignment and (3) provide a substantially uniform temperature gradient along the length of the galvanometer coil suspension. Since approximately one-half of each of the galvanometers' suspensions is enclosed in the relatively massive permanent magnet 216 and the other half is enclosed in a relating light housing 93 and 93a, without the pedestal mount 41 the galvanometer coils or mirrors would be displaced due to an uneven temperature gradient along the length of the coil suspensions 91.

It should be understood that the natural or resonant frequency of the galvanometers of the oscillographs should be considerably higher than the dominant frequency of the vibration of the drill stem in which the galvanometer is mounted in order to minimize deflection of the galvanometer mirrors by mechanical forces. A 500 c.p.s. galvanometer has been found satisfactory for use at conventional rotary drilling speeds, however, at higher speeds, such as those encountered in the turbo drilling operations, galvanometers having a higher natural frequency may be desired.

It can be readily seen that the oscillograph of this invention is protected from angular shock, e.g., sudden rotational deceleration or acceleration, through the pivotal mounting utilizing the bearings 42 and 44 and that the galvanometers have been further protected by being positioned on or near the axis of rotation of the inner case 48 to minimize the effect of centrifugal force on these sensitive elements. To protect the oscillograph from longitudinal or vertical forces, shock-absorbing material, such as, first and second rubber cushions 190 and 192 are disposed between the lower end-plate 54 of the inner case 48 and the lower end of a frame 188 on which the elements of the oscillograph and the signal source are mounted and between the upper end-plate 52 of the inner case 48 and the camera 78 which is attached by means of bolts 189 to the upper end of the frame 188. To protect the elements of the logging equipment within the inner case 48, from transverse shock, shock-absorbing material 179, for example, a rubber-like material, preferably neoprene is applied to the outer surfaces or periphery of the frame 188 to be disposed between the frame 188 and the cylinder 50 of the inner case 48 when the oscillograph is in its operative position during the drilling operation.

Since the drilling rate of a borehole by drilling apparatus of the rotary or turbo type in which the oscillograph of this invention may be used is a relatively slow rate compared with the rate of travel of a conventional borehole logging unit, the film 214 in the camera is driven by the motor 100 at a known constant slow rate of speed, preferably about 1.7 inches per hour. The constant speed motor 100 may operate, for example, at about 8,000 revolutions per minute, the gear train 102 which is connected to the motor 100 has a gear reduction ratio of 16,833 to 1, and the worm gear 210 provides for a further gear reduction of about 25 to 1 in order to produce the film speed of about 1.7 inches per hour. The mercury cells which may be used in the power supply 25 have an operating life of at least 36 hours and the length of the film 214 is about 60 inches. Consequently, it can be seen that the apparatus of this invention may be in continuous operation for a length of time at least equal to the operating life of a rotary drill bit which is generally about 24 hours. If it is desired to use a longer strip of film 214 in the camera 78, the supply spool 198 loaded with bulk film is preferred to a film casette. Each time that the bit is taken out of the borehole the inner case 48 is recovered by breaking the drill stem at a joint immediately above the tubular housing 14 and removing upper cap 24 from the capsule 20. The top end plate 52 is then removed from the cylinder 50 of the inner case 48, the frame 188 is withdrawn from the inner case 48 and the camera 78 is detached from the frame 188. The camera 78 may be taken to any suitable dark room where the exposed film may be removed and developed. An unexposed roll of film may then be inserted into the camera and the camera again attached to the frame, for example, by suitable bolt means. However, if desired a second camera having an unexposed film loaded therein may be attached to the frame 188 immediately after the camera with the exposed film is detached. At this time new cells may also replace the used cells and the logging apparatus may be reassembled to log another section of the subsurface strata while it is being drilled.

Accordingly, it can be seen that the invention provides a recording device which may be readily used in a self-contained logging apparatus located in the drill stem near the drill bit and operated during the drilling process where extreme conditions of heat, shock, and mechanical vibrations exist.

It should be noted that the film 214 is driven at a constant speed from a noted or recorded starting time so that the amount of film which has passed the opening 196 in the camera 78 is at all times known. In order to determine the depth at which the apparatus is logging at a given time it is only necessary to correlate the location of the drill bit in the borehole with time. Consequently, with this information the deflections recorded on film 214 can be plotted against depth. The time-depth recording device may be of any suitable type but it has been found that convenient devices for correlating the depth in the borehole of the drill bit with time are the well known Geolograph and Rig-Runner which may be used to provide a record of the height of the kelly or travelling block in the derrick against time and which type is described more fully in U.S. Patents Nos. Re. 21,297 and 2,287,819. Knowing the amount of travel of the kelly or block with time, the depth of the bit can be determined accurately, thus providing sufficient information to readily produce a graph of a characteristic versus depth.

Logs for thousands of feet of borehole have been drilled and simultaneously recorded in the borehole with the recording device illustrated in the figures of the drawing and these logs have compared favorably with logs of the same boreholes which were subsequently produced by similar logging arrangements of conventional logging equipment taken after the borehole drilling process had been completed. For a more complete description of the type of logging while drilling apparatus in which the recording device of the present invention may be used reference may be had to copending application Serial No.

677,969, filed August 13, 1957 by R. J. Clements, B. D. Lee and R. B. Stelzer.

Obviously many modifications and variations of the invention as hereinabove set forth may be made without departing from the spirit and scope thereof and therefore, only such limitations should be imposed as are indicated in the appended claims.

We claim:

1. A recording device adapted for use in rotatable apparatus during rotation thereof comprising a housing, means for attaching said housing to said rotatable apparatus comprising means for mounting said housing for free rotation relative to said apparatus about the rotational axis of said rotatable apparatus, means disposed within said housing for receiving information and means disposed within said housing for recording said information, said recording means comprising an oscillograph including a camera and a galvanometer, said camera having a strip of photographic film, said galvanometer including means for producing a light beam and means including a movable mirror adapted to direct said light beam onto said film, said galvanometer having a coil disposed on the axis of rotation of said freely rotatable apparatus, and said movable mirror being attached to said coil for controlling the light signal directed onto said film.

2. Apparatus as defined in claim 1 wherein the means for recording said information including said oscillograph galvanometer further including a front surface mirror disposed to direct the light beam towards said movable mirror and to deflect the light beam from said movable mirror to said photographic film.

3. Apparatus as set forth in claim 2 wherein said galvanometer further includes a permanent magnet for producing a magnetic field, suspension means for supporting said coil in said magnetic field and a galvanometer housing adapted and arranged to support one end of said suspension means, the other end of said suspension means being attached to a point within said permanent magnet.

4. Apparatus as set forth in claim 3 further including a damping block attached to said permanent magnet and having a retaining means for supporting the upper portion of said housing, said block being composed of material capable of providing a substantially uniform temperature gradient along the entire length of said suspension means.

5. A rotary drilling apparatus comprising a tubular member adapted to be coupled in a rotatable drill string in the vicinity of a drill bit for conducting a log during the course of drilling the well, a logging instrument mounted within said tubular member, said logging instrument including an oscillograph comprising a camera and a galvanometer having a plurality of coils, a plurality of galvanometer mirrors, one of said mirrors being rigidly secured to each of said galvanometer coils, means for producing a light beam and a front surface mirror disposed to deflect said light beam to each of said galvanometer mirrors and to reflect the light beam from each of said galvanometer mirrors to said camera, and a logging signal source and circuit means coupling said signal source to each of said plurality of coils so as to simultaneously apply signals of varying strength to each of said plurality of coils, each of said coils being positioned substantially on the rotational axis of said tubular member.

6. Apparatus for well logging comprising a tubular member adapted to be coupled in a drill string in the vicinity of the drill bit, a pressure-tight capsule disposed within and rigidly secured to said tubular member so as to provide a fluid passage through said tubular member, an inner case including apparatus for conducting a log in the borehole disposed within said capsule and means for supporting said inner case within said capsule so as to permit said inner case to be freely rotatable therein about the longitudinal axis of said tubular member, said inner case including an oscillograph comprising a shutterless camera including an opaque housing having an opening therein and means for moving film past the opening in said housing, an elongated frame, means mounted on said frame for producing a constant magnetic field, a coil disposed in said field on the longitudinal axis of the frame and adapted to receive an electric signal, means for producing a beam of light of constant intensity, a first mirror attached to said coil, a lens, and a second mirror disposed to reflect the light beam from said light beam producing means to said mirror and to reflect the reflected light beam from said first mirror to the lens and the opening in said camera housing, said coil being positioned substantially on the rotational axis of said inner case.

7. In an elongated tubular instrument assembly adapted to be passed through a borehole, an oscillograph comprising a galvanometer including means for producing a light signal and a camera including a strip of photographic film, a supply spool, a take-up spool and means for moving the film between the supply spool and the take-up spool, said moving means comprising a constant speed motor, said galvanometer being disposed in said tubular instrument assembly between said motor and said film, said camera including an elongated cylindrical housing having an aperture therein disposed to receive said light signal, and a shutter adapted to selectively cover said aperture so as to be in a closed position for preventing light from passing through said aperture, said shutter having control means including an arm adapted to extend beyond the periphery of said housing when said shutter is in said closed position.

References Cited in the file of this patent

UNITED STATES PATENTS

| | | |
|---|---|---|
| 1,503,401 | Wechsler | July 29, 1924 |
| 1,782,474 | McLaughlin | Nov. 25, 1930 |
| 1,794,966 | Legg | Mar. 3, 1931 |
| 1,977,027 | Vaughan | Oct. 16, 1934 |
| 2,095,849 | Wittel | Oct. 12, 1937 |
| 2,170,857 | Elliott | Aug. 29, 1939 |
| 2,293,349 | Martin et al. | Aug. 18, 1942 |
| 2,305,664 | Bogopolsky | Dec. 22, 1942 |
| 2,313,310 | Arnold | Mar. 9, 1943 |
| 2,336,279 | Mihalyi | Dec. 7, 1943 |
| 2,349,366 | Moon | May 23, 1944 |
| 2,382,609 | Dale | Aug. 14, 1945 |
| 2,404,622 | Doan | July 23, 1946 |
| 2,428,034 | Nichols et al. | Sept. 30, 1947 |
| 2,615,778 | Butz | Oct. 28, 1952 |
| 2,659,653 | Owens | Nov. 17, 1953 |
| 2,664,024 | Hansen | Dec. 29, 1953 |
| 2,670,660 | Miller | Mar. 2, 1954 |
| 2,716,730 | Williams | Aug. 30, 1955 |
| 2,728,554 | Goble | Dec. 27, 1955 |
| 2,737,864 | Gutterman et al. | Mar. 13, 1956 |
| 2,797,976 | Ring | July 2, 1957 |